Jan. 12, 1943.  O. A. PALM  2,307,853
METAL CUTTING TOOL
Filed March 28, 1942
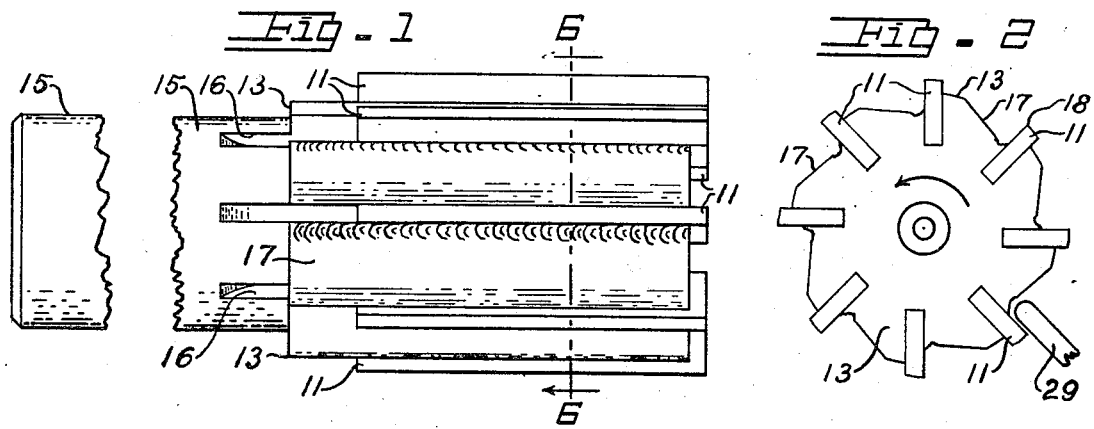
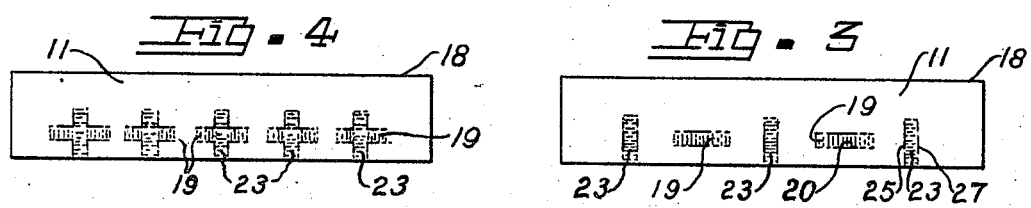
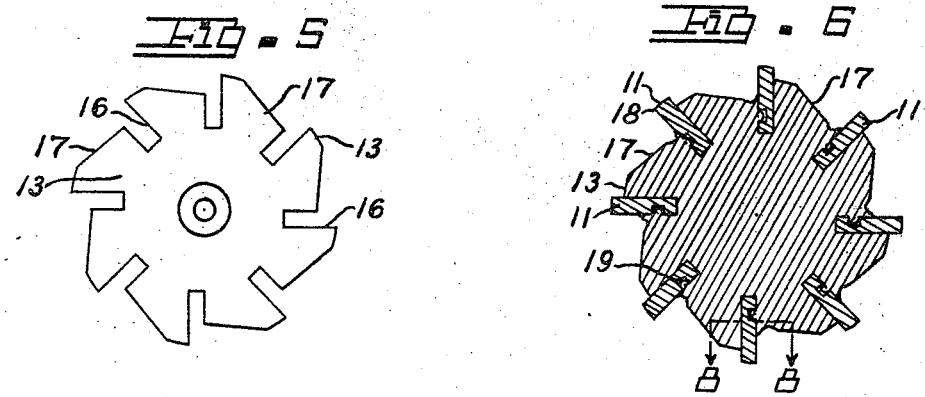
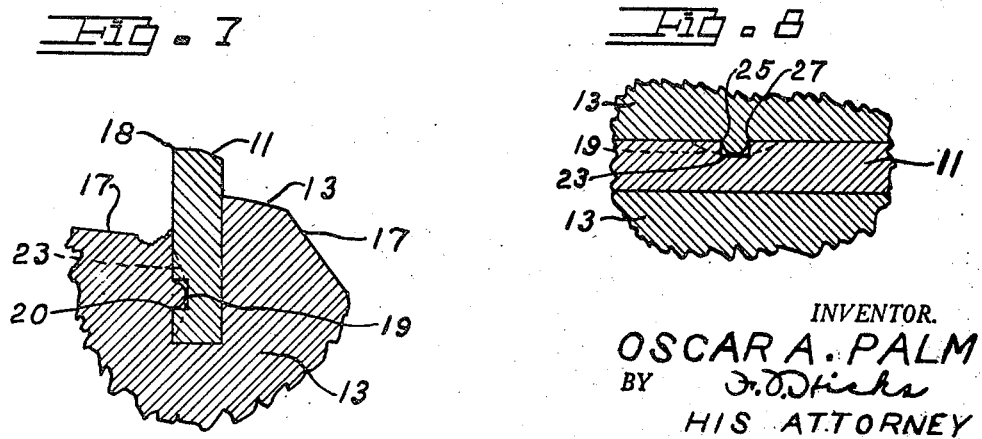
INVENTOR.
OSCAR A. PALM
BY
HIS ATTORNEY Patented Jan. 12, 1943

2,307,853

UNITED STATES PATENT OFFICE 2,307,853

METAL CUTTING TOOL

Oscar A. Palm, Detroit, Mich.

Application March 28, 1942, Serial No. 436,589

3 Claims. (Cl. 76—101)

My invention pertains to metal cutting tools such as reamers, milling cutters and the like, and more particularly to an improved method of and construction for mounting and securing cutter blades in a tool body or shank.

It is an object of my invention to provide an improved method of and construction for firmly securing one or more cutter blades of expensive high speed tool steel in a recess in a tool body of a cheaper and softer metal such that tools can be manufactured more rapidly and more economically.

It is also an object of my invention to provide an improved method of and construction for firmly mounting and securing one or more blades of hard high speed tool steel in a tool body or shank of a cheaper and softer metal in nonfused relation and without the application of heat, as in welding or brazing, adversely effecting the temper, hardness and durability of the cutter blades so that tools may be economically and quickly manufactured having improved cutting characteristics and substantially longer life and greater durability.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunuction with the drawing disclosing specific embodiments of my invention, similar reference characters being applied to corresponding elements throughout, and in which:

Fig. 1 is a side elevational view showing a metal cutting reamer constructed in accordance with my invention;

Fig. 2 is an end elevational view of the reamer showing the ends of the tool body and the cutter blades;

Fig. 3 is an enlarged plan view of the recessed side of a single cutter blade showing the recesses or open cut out portions provided therein before the blade is mounted in the tool body;

Fig. 4 is a similar view of a cutter blade showing a different modification of the cut out recesses;

Fig. 5 is an end elevational view of the recessed tool body before the blades have been inserted;

Fig. 6 is a cross sectional view taken on line 6—6 of Fig. 1 through a recess or cut out portion of each cutter blade showing how the metal of the tool shank enters to prevent either radial or axial displacement of the blade;

Fig. 7 is a greatly enlarged fragmentary view of a portion of Fig. 6 showing only one of the cutter blades secured permanently in a portion of the tool body; and Fig. 8 is an enlarged fragmentary sectional view taken longitudinally on line 8—8 in Fig. 6.

Referring more specifically to Figs. 1, 2, and 3 of the drawing, I have illustratively disclosed my invention embodied in a metal cutting reamer comprising metal cutter elements 11 made of an expensive high speed tool steel mounted in an elongated tool body or shank 13 made of a softer and less expensive steel, or other metal, of a generally cylindrical conformation having one end 15 of a smaller diameter and conformed suitably for mounting in a chuck or other suitable turning mechanism. There are several different metals suitable for making such high speed metal cutting elements 11 but, as such metals are expensive and difficult to obtain, it is very desirable and necessary to mount these precious elements in such a manner as to require a minimum quantity of the high speed tool steel and also in such a condition as to preserve and utilize to the utmost the very desirable metal cutting properties and durability thereof.

The end of the tool body remote from the chuck end is provided with a plurality of long parallel sided grooves or slots 16 extending axially therein and suitable for snugly receiving a portion of the cutter elements. The portion of the tool body 13, of larger diameter, is cut down along one side of each groove 16 providing a flattened surface 17. Each metal cutter element 11 is an elongated strip of uniform thickness and having one edge shaped to present a suitable metal cutting edge 18.

In accordance with my invention I provide in a side surface of the cutter element one or more locking recesses or cut out portions suitably formed for receiving metal swaged from the tool body and for locking firmly therewith to secure and lock the cutting element permanently in the tool body. Locking recesses in the side of the cutter element 11 are preferably short slots 19, cut axially or longitudinally in the side of the element in any suitable manner, as by means of a small milling cutter for example. Such short locking slots 19 present sharp cornered edges 20 which effectively interlock with the metal from the tool body preventing radial displacement of the element in a manner to be subsequently described.

Also to firmly resist axial movement of the cutter element 11 in the tool body, each cutter element is provided with a short slot 23 cut radially in the side of the element. The slot 23 presents sharp cornered edges 25 and 27 for respectively locking firmly with body metal to resist longitudinal or axial movement of the cutter element in either respective direction. A plurality of such short slots 19 and 23 are preferably provided in spaced relation in a side surface of each cutter element 11. These short slots may be spaced separately as shown in Fig. 3 or may be formed in overlapping or intersecting relation, as shown in Fig. 4. The blades 11 are hardened after being recessed and sharpened.

In making such a tool, one of the recessed cutter elements 11 is inserted and pressed snugly into each elongated groove 16 in the tool body. By means of any suitable tool 29, such as a hammered hand tool, or a roller, a high pressure is applied to the tool body along the flattened side 17 of each elongated groove 16 adjacent the recessed side of the cutter element 11 therein inserted. This swages the metal of the tool body and causes it to flow into snug abutting engagement with the side of the cutter element 11 and also causes the metal to flow into the short slots 19 and 23 and to firmly interlock with the sharp cornered edges, as shown in Figs. 6, 7 and 8, holding firmly along the full blade length.

I have found that this method of, and construction for, mounting the cutter elements 11 in the tool body 13 secures these elements very firmly against movement radially or axially in either direction. The cutter elements are permanently a part of the tool and may be repeatedly resharped and used up, and the same principles may be embodied in other tools besides reamers. A tool so constructed has great durability and long life because the cutter elements of high speed tool steel are mounted in unfused relation in the tool body without having been exposed to the high temperatures from welding or brazing.

It is apparent that within the scope of the invention, modifications and different arrangements may be made other than herein disclosed, and the present disclosure is illustrative merely, the invention comprehending variations thereof.

I claim:

1. In combination in a metal cutting reamer, metal cutter blades of high speed tool steel, each cutter blade being of an elongated striplike conformation and having one edge thereof suitably formed to provide a cutting edge, a portion of a side surface of the blade having short slots cut axially providing a sharp corner edge to lock against radial movement and short slots cut radially to provide a sharp slot edge for locking the cutter blade against axial movement in one direction and an oppositely directed sharp slot edge for locking the cutting blade firmly against movement in an opposite axial direction, a tool body of a softer and cheaper metal than said cutter blade, said tool body being of an elongated generally cylindrical conformation adapted to be rotated, one end of said tool body being adapted to be inserted and gripped in a chuck or other suitable turning mechanism, the other portion of said tool body being provided with parallel sided grooves extending axially therein and each groove being suitably conformed for receiving the edge portion of a cutter blade remote from the cutter edge, a cutter blade inserted into and snugly seated in each groove in the tool body with the cutting edge projecting therefrom, means firmly and permanently securing each cutter blade in unfused durable metal cutting condition in the tool body consisting of body metal permanently deformed from one side of the groove in the tool body adjacent the slotted side of the blade for gripping the side surface of the blade and the permanently deformed metal projecting into the short axial slots and into the short radial slots in the side of the blade for locking the cutter blade or blades against radial or axial movements in the tool body.

2. The method of mounting a strip shaped metal cutting blade of high speed tool steel in a grooved tool body of softer metal in an unfused durable metal cutting condition which consists in, cutting one or more short slots axially in one side of the blade, cutting one or more short slots radially in the side of the blade, inserting one edge of the blade into the groove in the tool body, and applying pressure on the tool body along the side of the groove adjacent the slotted side of the blade such as to permanently deform the body metal into gripping engagement with the blade, into each axial slot to firmly resist radial moving of the blade in the groove in the body and into each radial groove to firmly resist movement of the blade axially in the body groove.

3. In combination in a rotary metal cutting reamer, hardened metal cutter blades of high speed tool steel, each cutter blade being of an elongated striplike conformation and having one edge thereof suitably formed to provide a cutting edge, the side surface of each blade extending from the cutting edge having short slots cut axially providing a sharp corner edge to lock against radial movement and short slots cut radially to provide a sharp slot edge for locking the cutter blade against axial movement in one direction and an oppositely directed sharp slot edge for locking the cutting blade firmly against movement in an opposite axial direction, a tool body of a softer and cheaper metal than said cutter blade, said tool body being of an elongated generally cylindrical conformation adapted to be rotated, one end of said tool body being adapted to be inserted and gripped in a chuck or other suitable turning mechanism, the other portion of said tool body being provided with parallel sided grooves extending axially therein and suitably conformed for receiving the edge portion of each cutter blade remote from the cutter edge, a cutter blade inserted into and snugly seated in each groove in the tool body with the cutting edge projecting therefrom, means firmly and permanently securing each cutter blade in the tool body in a durable unfused condition consisting of body metal permanently deformed from one side of the groove in the tool body adjacent the slotted side of the blade for gripping the side surface of the blade and the permanently deformed metal projecting into the short axial slots and into the short radial slots in the side of the blade for locking the cutter blade or blades against radial or axial movements in the tool body.

OSCAR A. PALM.